Patented Apr. 7, 1936

2,036,202

UNITED STATES PATENT OFFICE 2,036,202

ANTHRAQUINONE LACTAM DYESTUFFS

Samuel Ellingworth, Norman Hulton Haddock, Frank Lodge, and Colin Henry Lumsden, Blackley, Manchester, England, assignors to Imperial Chemical Industries Limited, a corporation of Great Britain No Drawing. Application December 14, 1933, Serial No. 702,416. In Great Britain December 14, 1932

7 Claims. (Cl. 8—5)

In copending U. S. application Ser. No. 689,044, filed September 11, 1933, which has eventuated into U. S. Patent 1,975,061, we have described the preparation of dyestuffs having the following formula:

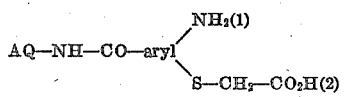

in which AQ stands for anthraquinone or substituted anthraquinone.

We have now found that other dyestuffs having the following formula:

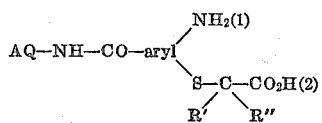

in which AQ stands as before for anthraquinone or substituted anthraquinone, R' and R" stand for hydrogen, alkyl, aryl or aralkyl groups, but R' and R" not both standing for hydrogen at the same time, may be produced in a manner similar to that described in the above referred to application. The groups attached to the —$C_6H_3$= group are located as indicated in the formula, i. e., the —$NH_2$ and —S— are ortho to one another and the AQ—NH—CO— is located at any other position in the ring.

We have found that the principles involved are capable of broader application and according to the present invention we make and reduce a dinitro-diaryl-disulphide-dicarboxy-amino-anthraquinone as described in U. S. Patent 1,975,061, and we treat the product with a halogeno acid of the general formula:

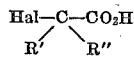

R' and R" having the significance given above, but R' and R" not both standing for hydrogen at the same time; or we cause to interact an amino-anthraquinone or substituted amino-anthraquinone with a lactam of the general formula:

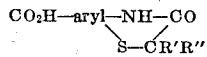

R' and R" having the significance given above but R' and R" not both standing for hydrogen, and we then hydrolyze (delactamize); or we cause to interact an amino-anthraquinone or substituted amino-anthraquinone with a halide of a nitro-carboxy-phenyl thio ester of the general formula:

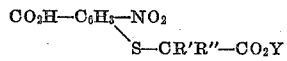

where R' and R" have the significance given above and Y stands for alkyl, aralkyl or the like, and we hydrolyze the ester group and subsequently or simultaneously reduce the nitro group.

The anthraquinone dyestuffs obtained in accordance with the invention are particularly valuable for the production of shades fast to light, washing, potting and milling on animal fibers, the dyestuffs being applied in a weak acid bath and subsequently lactamized on the fiber as described in U. S. Patent 1,975,061. The dyestuffs are also valuable for the manufacture of pigments and for use as vat dyestuffs.

The invention is illustrated, but not limited, by the following examples, in which the parts are by weight.

Example 1

3.1 parts of ethyl-2-nitro-4-carboxy-phenyl-thioglycollate, 1.6 parts of thionyl chloride and 20 parts of nitrobenzene are warmed with stirring at 110° for 2 hours. To the clear solution of the acid chloride are added 2.2 parts of 1-amino-anthraquinone and the mixture is stirred at 130–135° for 1 hour. Hydrogen chloride is evolved. The resulting clear solution is cooled to 30°, whereupon the acyl-amino-anthraquinone separates; it is filtered off and washed with nitrobenzene and alcohol. This intermediate compound is an orange yellow crystalline substance. For hydrolysis 2 parts of this compound are dissolved in 60 parts of boiling glacial acetic acid, and 7 parts of hydrochloric acid of 35% strength are gradually added, with good stirring. Boiling is continued for 30 minutes. The mixture is then cooled and the carboxylic acid filtered off and washed with water. The acid is now reduced by mixing it with 50 parts of alcohol and 6 parts of sodium sulphide crystals and boiling for five minutes. The mixture is cooled, a little hydrogen peroxide is added if necessary, and the new dyestuff filtered and washed with weak brine; it is dissolved in hot water, filtered from any insoluble matter that may be present, and precipitated by addition of salt. The dyestuff is identical with that described in Example 1 of U. S. Patent 1,975,061.

Example 2

4.8 parts of the intermediate compounds obtained from 2,2'-dinitro-4,4'-dicarboxy-diphenyldisulphide and 1-amino-anthraquinone as described in Example 1 of the specification of U. S. Patent 1,975,061, are mixed with a solution of 20.7 parts of sodium sulphide crystals in 108 parts of water and the mixture is heated to 65–70° and stirred at that temperature for one hour. 20 parts of salt are added to the solution. It is cooled, and the amino mercaptan is filtered off and pressed. This intermediate is dissolved in 92 parts of hot water and mixed with an aqueous solution made from 4.8 parts of 1-bromo-propionic acid and the appropriate amount of sodium hydroxide or carbonate. The mixture is heated at 90° until interaction is complete, alkali being added as needed to keep it alkaline. Salt is added. The solution is cooled and the product is filtered off, washed with 5% brine, and dried. The new dyestuff is a yellowish brown substance. It dyes wool from an acetic acid bath in orange yellow shades, changing on after-treatment with weak mineral acid to a bright golden yellow exceedingly fast to washing, milling and potting.

It is of course understood that this invention is not limited to the use of only the dinitro-diaryl-disulphide-dicarboxylic acid above mentioned, but contemplates the use of any of the compounds mentioned in U. S. Patent 1,975,061.

It is also understood that compounds of the above formula may also be produced by the methods described in U. S. Patent 1,975,061 by substituting for the chloroacetic acid therein used acids having the formula:

in which R' and R'' represent hydrogen, alkyl, aryl or aralkyl groups, but R' and R'' not both standing for hydrogen at the same time.

*Example 3*

12.2 parts of the intermediate compound obtained from 2:2'-dinitro-4:4'-dicarboxydiphenyl-disulphide and 1-amino-4-methoxy-anthraquinone as described in Example 2 of U. S. Patent 1,975,061 are made to a smooth paste with 200 parts of water. 50 parts of sodium sulphide crystals are added and the mixture stirred at 65–70° C. for half an hour. On cooling the sodium mercaptide is precipitated and this is filtered off and washed with 20% salt solution. This intermediate is dissolved in 200 parts of water and to the solution are added 14 parts of β-bromo-n-butyric acid which have previously been dissolved in water and neutralized with the appropriate amount of sodium carbonate. A further 10 parts of sodium carbonate are added and the mixture warmed at 90–95° for three quarters of an hour. After cooling to 70°, the dyestuff is filtered off and washed with dilute salt solution. The new dyestuff dyes wool from an acetic acid bath in orange shades changing on after-treatment with weak mineral acid to a bright scarlet shade of excellent fastness to washing, milling, potting and light.

*Example 4*

By substituting the appropriate quantity of α-bromo-n-butyric acid for the α-bromopropionic acid in Example 2, a dyestuff is obtained which dyes wool from an acetic acid bath in orange shades which changes to an orange-yellow on treatment with hot dilute mineral acid. The dyestuff has excellent fastness to washing, milling and potting.

*Example 5*

4 parts of the intermediate compound obtained from 2:2'-dinitro-4:4'-dicarboxydiphenyldisulphide and 1-amino-4-methylamino-anthraquinone by the method described in U. S. Patent 1,975,061 and heated with 12 parts of sodium sulphide crystals in 50 parts of methylated spirits at the boil for 20 minutes. The mixture is poured into 100 parts of water containing 6 parts of α-bromo-n-butyric acid neutralized with the appropriate quantity of sodium carbonate. A further 5 parts of sodium carbonate are added and the temperature raised to 90° for a quarter of an hour. 15 parts of common salt are added and after cooling to 50° the dyestuff is filtered. The dyestuff can be purified by redissolving in boiling water, filtering to remove insoluble matter and reprecipitating by the addition of salt.

When dyed from an acetic acid bath the dyestuff has good affinity for wool and the shade after treatment with hot dilute mineral acid is reddish-blue. It has excellent fastness to light, potting, milling and washing.

What we claim is:

1. Compounds of the following general formula:

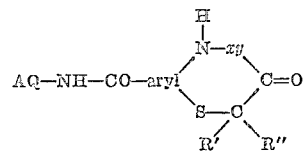

wherein AQ stands for an anthraquinone radical, R' and R'' stand for hydrogen, or an alkyl, aryl or aralkyl group, but R' and R'' not both standing for hydrogen at the same time, and wherein x and y represent a bond linking the N and C atoms or x represents hydrogen and y represents OH.

2. Compounds which in the form of their free acids have the following general formula:

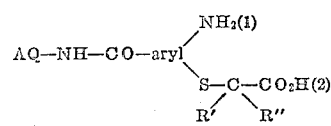

in which AQ stands for anthraquinone or substituted anthraquinone, R' and R'' stand for hydrogen, or an alkyl, aryl or aralkyl group, but R' and R'' not both standing for hydrogen at the same time.

3. Compounds of the following general formula:

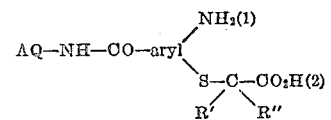

in which AQ stands for anthraquinone or substituted anthraquinone, R' and R'' stand for hydrogen, or an alkyl, aryl or aralkyl group, but R' and R'' not both standing for hydrogen at the same time.

4. In the preparation of dyestuffs of the class described, the steps which comprise reacting a dinitro-diaryl-disulphide-dicarboxy-amino-anthraquinone with a halogeno acid of the general formula:

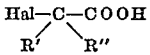

in which R' and R'' stand for hydrogen, or alkyl, aryl or aralkyl groups, but R' and R'' not both standing for hydrogen at the same time.

5. In the preparation of dyestuffs having the following general formula:

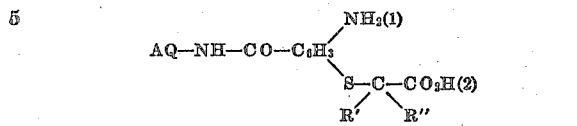

in which AQ stands for anthraquinone or substituted anthraquinone, R' and R'' stand for hydrogen, alkyl, aryl or aralkyl groups, but R' and R'' not both standing for hydrogen at the same time, the process which comprises reacting an amino-anthraquinone compound with a halide of a nitro-carboxy-phenyl-thio ester of the general formula:

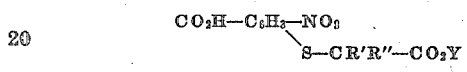

where R' and R'' have the significance given above, and Y stands for an alkyl or aralkyl group, hydrolyzing the ester group and reducing the nitro group to the corresponding amine.

6. The process for dyeing fiber which comprises applying thereto a solution of a compound of the general formula:

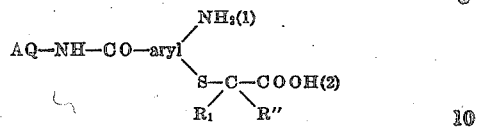

wherein AQ stands for an anthraquinone radical, R' and R'' stand for hydrogen, or an alkyl, aryl or aralkyl group, but R' and R'' not both standing for hydrogen at the same time, and thereafter treating the fiber with a dilute mineral acid to lactamize the dyestuff, thereby fixing it to the fiber.

7. Fiber dyed with a compound as defined in claim 1.

SAMUEL ELLINGWORTH.
NORMAN HULTON HADDOCK.
FRANK LODGE.
COLIN HENRY LUMSDEN.